| United States Patent [19] | [11] Patent Number: 4,581,342 |
| Johnson et al. | [45] Date of Patent: Apr. 8, 1986 |

[54] SUPPORTED OLEFIN POLYMERIZATION CATALYST

[75] Inventors: Bryce V. Johnson, Elburn; Nicholas M. Karayannis; Charles R. Hoppin, both of Naperville; Linda Ornellas, Woodridge, all of Ill.

[73] Assignee: Standard Oil Company (Indiana), Chicago, Ill.

[21] Appl. No.: 674,996

[22] Filed: Nov. 26, 1984

[51] Int. Cl.$^4$ .............................................. C08F 4/64
[52] U.S. Cl. .................... 502/119; 502/125; 502/126; 502/127; 502/152; 502/156
[58] Field of Search ............... 502/119, 125, 126, 127, 502/152, 156

[56] References Cited

U.S. PATENT DOCUMENTS

| 4,279,776 | 7/1981 | Shiga et al. | 502/119 X |
| 4,301,029 | 11/1981 | Caunt et al. | 502/127 X |
| 4,310,439 | 1/1982 | Langer | 502/127 X |
| 4,314,912 | 2/1982 | Lowery et al. | 502/119 X |
| 4,363,746 | 12/1982 | Capshen | 502/119 X |
| 4,471,066 | 9/1984 | Sakurai et al. | 502/119 X |

FOREIGN PATENT DOCUMENTS 2529209 12/1983 France .
2018789 10/1979 United Kingdom .
1586267 3/1981 United Kingdom .

*Primary Examiner*—Patrick P. Garvin
*Attorney, Agent, or Firm*—Wallace L. Oliver; William T. McClain; William H. Magidson

[57] ABSTRACT

A solid-hydrocarbon insoluble, alpha-olefin polymerization catalyst component with superior activity, stereospecificity and morphology characteristics, comprises the product formed by (a) complexing a magnesium alkyl composition with an ortho disubstituted hindered aromatic acid ester; (b) reacting the resulting complex with a compatible precipitation agent to form a solid component; and (c) reacting the resulting solid with a titanium(IV) compound and an electron donor compound in a suitable diluent.

26 Claims, No Drawings

SUPPORTED OLEFIN POLYMERIZATION CATALYST

BACKGROUND OF THE INVENTION

This invention relates to catalyst systems useful for polymerizing alpha-olefins and particularly relates to a supported titanium halide catalyst component containing a specific class of hindered aromatic esters.

Magnesium-containing supported titanium halide-based alpha-olefin polymerization catalyst components are now well known in the art. Typically, these catalysts are recognized for their performance based on activity and stereospecificity. However, commercial olefin polymerization, especially gas-phase alpha-olefin polymerization, requires additional catalyst attributes for economical large-scale operation. Specifically, polymer morphology, typically dependent upon catalyst morphology, many times is critical. Included in good polymer morphology is uniformity of particle size and shape, resistance to attrition and an acceptably high bulk density. Minimization of very small particles (fines) typically is very important, especially in gas-phase polymerization to avoid transfer or recycle line pluggage. Very large particles also must be avoided to minimize formation of lumps and strings in the reactor. It has been found that usual modification of conventional supported catalysts to optimize morphology typically sacrifices such catalysts original activity and stereospecificity.

One catalyst system which exemplifies the activity/morphology dilemma is prepared by chlorination and precipitation of a hydrocarbon-soluble alkyl magnesium composition (which also may contain an aluminum alkyl compound) to a nearly spherical, uniform support. An olefin polymerization catalyst component is formed from such support by treatment with titanium tetrachloride and a suitable Lewis base. It has been found that a di-n-butylmagnesium/triethylaluminum complex reacted with silicon tetrachloride to form spherical support particles which were then reacted with titanium tetrachloride and diisobutylphthalate exhibited both low activity and low stereospecificity in propylene polymerization. A possible way to improve a such a catalyst would be to include a Lewis base during formation of a chlorinated support and prior to introduction of titanium tetrachloride. Among possible bases, aromatic esters, specifically ethylbenzoate, have almost universally been found to be the best compounds for this purpose. However, the use of such aromatic ester is incompatible with use of a magnesium alkyl. Usual aromatic esters such as ethylbenzoate, ethyl p-anisate, methyl-p-toluate or dialkylphthalates react rapidly and irreversibly with magnesium alkyls through alkylation of the esters. Also, it has been found that the precipitation reaction with silicon tetrachloride is disrupted and the particle uniformity or particle morphology of a resultant catalyst is destroyed.

Use of magnesium alkyls in preparation of supported olefin polymerization catalysts is known. However, formation of a stable magnesium alkyl complex with a hindered ester prior to precipitation has not been described. Examples of use of magnesium alkyls are U.S. Pat. Nos. 4,115,319, 4,199,473, 4,321,347 and 4,416,799; U.K. Pat. Nos. 1,586,267 and 2,018,789; Published European Patent Applications Nos. 45,533 and 67,416; and French Pat. No. 2,529,209.

Catalyst components of the present invention are formed using stable complexes of a magnesium alkyl composition and an alkyl hindered aromatic acid ester. Although not describing such donor-acceptor complexes of the present invention, French Pat. No. 2,529,209 discloses a catalyst component prepared from spherical magnesium chloride made by chlorinating di-n-butyl magnesium in isoamyl ether with t-butylchloride. Although we have observed that addition of specific amounts of a base such as isoamyl ether or 2,2,6,6,-tetramethylpiperidine to a magnesium alkyl-aluminum alkyl composition prior to reaction with silicon tetrachloride improves overall performance of a resultant catalyst without destroying morphology, catalysts formed using the ortho disubstituted hindered aromatic acid esters of this invention achieve a much greater improvement in catalyst performance.

SUMMARY OF THE INVENTION

A solid hydrocarbon-insoluble, alpha-olefin polymerization catalyst component with superior activity, stereospecificity and morphology characteristics, comprises the product formed by (a) complexing a magnesium alkyl composition with an ortho disubstituted hindered aromatic acid ester; (b) reacting the resulting complex with a compatible precipitation agent to form a solid component; and (c) reacting the resulting solid with a titanium(IV) compound and an electron donor compound in a suitable diluent.

BRIEF DESCRIPTION OF THE INVENTION

Catalysts prepared according to this invention show high activity and stereospecificity with controlled morphology characteristics in alpha-olefin, especially propylene, polymerization. These catalysts are based on supports derived from the complexation of magnesium alkyls with a special class of ortho disubstituted sterically hindered aromatic acid esters. It has been found that combinations of certain sterically hindered aromatic acid esters with a magnesium alkyl compound prior to precipitation with a halogenating agent, such as silicon tetrachloride, greatly increases the activity of the ensuing catalyst while reducing combined hexane solubles and extractables. Excellent morphology aspects of a precipitated support are retained with the polymer produced exhibiting an extremely narrow particle size distribution. Catalysts prepared by this method differ from those using weaker bases, for example ethers and hindered amines, in that the ester is retained as a stoichiometric component of the halogenated support. The catalyst component of this invention typically is prepared by complexing a magnesium alkyl composition with a specific class of hindered aromatic ester, followed by reaction with a compatible precipitation agent and a suitable titanium(IV) compound in combination with an electron donor compound in a suitable diluent.

In the complexation of the magnesium alkyl composition with the hindered aromatic ester, typically, the molar ratio of magnesium to ester ranges from about 1/1 to about 3/1, preferably about 1.5/1 to about 2/1. By using a molar excess of magnesium alkyl compound essentially all of the hindered aromatic ester is complexed. Typically, the complexation occurs at room temperature in a non-reactive hydrocarbon-based solvent, although suitable lower or higher temperatures may be used.

In the precipitation reaction, the magnesium alkyl-hindered ester complex is combined with a suitable precipitation agent such as silicon tetrachloride. In a typical procedure the two components are mixed at about room temperature with stirring. The mixture may be heated moderately to accelerate the precipitation reaction for about one to twenty-four hours. The resulting solid precipitate may be isolated and washed with a suitable liquid hydrocarbon before reaction with a titanium(IV) compound.

The solid precipitate obtained by reacting a precipitation agent with the magnesium alkyl-hindered ester complex is combined with a suitable titanium(IV) compound in a suitable diluent. Typically, this mixture is permitted to react by heating to moderate temperature up to about 120° C. A convenient method is to conduct the reaction at reflux temperature of the diluent. Usual reaction times are from about one to about four hours. Typically, the resulting solid, hydrocarbon-insoluble component is isolated and washed with a suitable hydrocarbon.

A key aspect to this invention is the formation of a stable complex between a magnesium alkyl and the sterically hindered aromatic acid ester. It is believed that the superior solid catalyst components of this invention are formed through a complex of an ortho disubstituted hindered aromatic ester and a magnesium alkyl. The term hindered aromatic acid ester refers to substitution of an aromatic acid ester at both ortho positions such that a stable complex can be formed between the aromatic acid esters and a magnesium alkyl. Non-hindered aromatic acid esters such as ethylbenzoate, ethyl p-anisate, ethyl pivalate, ethyl 2,6-dimethoxybenzoate, ethyl o-toluate, t-butylbenzoate, methyl-p-toluate or dialkylphthalates react rapidly and irreversibly with magnesium alkyls to yield alkylated products.

The hindered aromatic esters useful in this invention typically have structures:

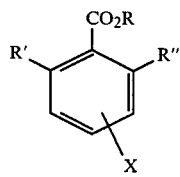

wherein R is an alkyl or substituted alkyl containing 1 to about 10 carbon atoms, R' and R" are alkyl or substituted alkyl groups containing 1 to about 6 carbon atoms or other substituents having similar characteristics such as —Cl and —Br. In addition, the aromatic moiety may be substituted in positions meta or para to the carboxylic acid ester group by various substituents such as hydrogen, alkyl or substituted alkyl, alkoxy, aryl, halides and other compatible groups. Examples of alkyl hindered aromatic acid esters include ethyl 2,4,6,-trimethylbenzoate, ethyl 2,6,-dimethylbenzoate, ethyl 2,4,6,-triethylbenzoate, ethyl 2,6-diethylbenzoate, methyl 2,4,6,-trimethylbenzoate, ethyl 2,3,5,6-tetramethylbenzoate, ethyl 2,6-bis(triflouromethyl)benzoate, methyl 2,6-dimethylbenzoate, ethyl 2,6-dimethyl-6-ethylbenzoate, ethyl 2,6-dimethyl-4-ethylbenzoate and like. Ethyl 2,6-dimethylbenzoate and ethyl 2,4,6-trimethylbenzoate are most preferred in this invention. Mixtures of hindered esters may be used.

Magnesium alkyls useful in this invention include those with alkyl groups containing about 1 to 10 carbon atoms and particularly di-n-methyl magnesium, di-n-propyl magnesium, di-n-ethyl magnesium, di-n-butyl magnesium butyloctyl magnesium and the like. The alkyl groups contained in such magnesium alkyls may be the same or different. Mixtures of magnesium alkyls may be used. The preferable magnesium alkyl is di-n-butyl magnesium. Such magnesium alkyls also may be used in conjunction with aluminum alkyls such as triethylaluminum or other chain-breaking agents such as diethyl ether to modify viscosity of the alkyl mixture. One such useful mixture is referred to as MAGALA (7.5)-E which is a di-n-butyl magnesium/triethyl aluminum mixture. Another useful mixture is BOMAG-D which is a mixture of butyloctyl magnesium and about 0.25 wt. % diethylether.

In a typical preparation scheme an excess of magnesium alkyl or magnesium alkyl/aluminum alkyl mixture is complexed with a portion of an ortho disubstituted aromatic ester. Formation of a complex typically can be confirmed by observing a shift of the absorbance due to carbonyl stretching in the infrared spectrum. In a complex between ethyl 2,4,6-trimethylbenzoate and MAGALA (7.5)-E a shift in carbonyl absorbance from 1732 cm$^{-1}$ to 1675 cm$^{-1}$ was noted. A test for a suitable hindered aromatic ester useful in this invention is to react an aromatic ester with a two molar excess of a dialkyl magnesium such as MAGALA (7.5)-E and determine the stability of the resulting complex by observing a decrease in infrared absorbance of the complexed carbonyl band as a function of time. Data for a selection of aromatic esters are shown in Table A.

TABLE A

| Relative Stability of Alkylmagnesium/Ester Complexes | | | |
|---|---|---|---|
| Ester | Free Ester ($\nu_{co}$cm$^{-1}$) | Complex ($\nu_{co}$cm$^{-1}$) | $t_{\frac{1}{2}}$ (min)$^a$ |
| Ethyl Benzoate | 1730 | b | <0.5 |
| Ethyl p-Anisate | 1724 | b | <1.0 |
| t-Butyl Benzoate | 1723 | 1663 | 3 |
| Ethyl o-Toluate | 1726 | b | <1.0 |
| Ethyl Pivalate | 1737 | 1679 | 5 |
| Ethyl 2,6-Dimethoxybenzoate | 1737$^b$ | 1657$^c$ | 5 |
| Ethyl 2,6-Dichlorobenzoate | 1753 | 1694 | 54 |
| Ethyl 2,6-Bis-(trifluoromethyl)-benzoate | 1757 | 1698 | d |
| Ethyl 2,6-Dimethylbenzoate | 1736 | 1679 | 920 |
| Ethyl 2,4,6-Trimethylbenzoate | 1732 | 1675 | 1200 |
| Diisobutylphthalate | 1732 | b | <1.0 |

$^a$Estimate based on: $t_{\frac{1}{2}} = 1/k_2 a$, where $k_2 = x/a(a-x)t$ (x determined from IR spectra at time t)
$^b$Complex lifetime was too short to measure ($t_{\frac{1}{2}}$ estimated from color change)
$^c$Recorded in toluene
$^d$Only partially complexed; complex appears to be very stable The above-described complex can be reacted with a precipitation agent such as silicon tetrachloride with resulting solid material typically washed and separated. Typically, such solid material contains a substantial quantity of the alkyl hindered aromatic acid ester. Such solid precipitates then can be combined with a titanium-containing compound such as titanium tetrachloride and a suitable electron donor such as an aromatic ester usually in a compatible diluent such as toluene, chlorobenzene, or a mixture of chlorobenzene and a chlorinated alkane and reacted at a suitable temperature typically from about 80° C. to about 140° C. and preferably about 90° C. to about 120° C.

Compatible precipitation agents useful in this invention typically halogenate the magnesium alkyl-hindered ester complex and include silicon tetrachloride, t-butyl chloride and dry hydrogen chloride. Some agents which halogenate magnesium compounds may not be suitable precipitation agents useful in this invention. For example, titanium tetrachloride is not a compatible precipitation agent because reduction of the titanium by magnesium results in coprecipitation of undesirable titanium trichloride species.

Organic electron donors useful in Step C in preparation of stereospecific supported catalyst components many times can be organic compounds containing one or more atoms of oxygen, nitrogen, sulfur and phosphorus. Such compounds include organic acids, organic acid esters, alcohols, ethers, aldehydes, ketones, amines, amine oxides, amides, thiols and various phosphorous acid esters and amides and like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

The preferred electron donor compounds include esters of aromatic acids. Preferred organic electron donors according to this invention are $C_1$-$C_6$ alkyl esters of aromatic mono- and di-carboxylic acids and halogen-, hydroxyl-, oxo-, alkyl-, alkoxy-, aryl-, and aryloxy-substituted aromatic mono- and di-carboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, diethylphthalate, and din-butylphthalate.

Titanium(IV) compounds useful in reacting the precipitated solid compound of this invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

Typical suitable diluents useful in Step C of the preparation procedure for the catalyst component of this invention are aromatic or substituted aromatic liquids, although other hydrocarbon-based liquids may be used. Aromatic hydrocarbons, such as toluene, and substituted aromatics, such as chlorobenzene have been found suitable. A preferable diluent is a halogenated aromatic such as chlorobenzene or a mixture of a halogenated aromatic such as chlorobenzene and a halogenated aliphatic such as dichloroethane. A suitable diluent should boil at a high enough temperature to promote reaction and not adversely affect resulting catalyst performance.

Other examples of useful diluents include alkanes such as hexane, cyclohexane, ethylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

In addition, the reaction mixture of in Step C of a magnesium-containing compound and transition metal component such as a titanium(IV) compound can contain chlorocarbons and/or organo silanes. Chlorocarbons and/or organochlorosilanes are advantageously present during the reaction of the transition metal component and magnesium carboxylate to provide a better medium for the activation of the catalyst.

Suitable useful chlorocarbons contain one to about 12 carbon atoms and from one to about 10 chlorine atoms. Examples of chlorocarbons include chloroform, methylene chloride, 1,2-dichloroethane, 1,1-dichloroethane, 1,1,2-trichloroethane, 1,1,1-trichloroethane, carbon tetrachloride, ethyl chloride, 1,1,2,2-tetrachloroethane, pentachloroethane, hexachloroethane, 1,1-dichloropropane, 1,2-dichloropropane, 1,3-dichloropropane, 2,2-dichloropropane, 1,1,1-trichloropropane, 1,1,2-trichloropropane, 1,1,3-trichloropropane, 1,2,3-trichloropropane, 1,1,1,2-tetrachloropropane, 1,1,2,2-tetrachloropropane, 1,1,1,2,3-pentachloropropane, 1,1,2,3,3-pentachloropropane, 2-methyl-1,2,3-trichloropropane, 1,1-dichlorobutane, 1,4-dichlorobutane, 1,1-dichloro-3-methylbutane, 1,2,3-trichlorobutane, 1,1,3-trichlorobutane, 1,1,1,2-tetrachlorobutane, 1,2,2,3-tetrachlorobutane, 1,1,2,3,4,4-hexachlorobutane, 1,1,2,2,3,4,4-heptachlorobutane, 1,1,2,3,4-pentachlorobutane, 2-methyl-2,3,3-trichlorobutane, 1,2-dichloropentane, 1,5-dichloropentane, 1,1,2,2-tetrachlorohexane, 1,2-dichlorohexane, 1,6-dichlorohexane, 3,4-dichloro-3,4-dimethylhexane and the like. Preferable chlorocarbons used in this invention include carbon tetrachloride, 1,1,2-trichloroethane and pentachloroethane.

Haloalkylchlorosilanes useful in this invention include compounds with the formula

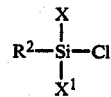

wherein R is a haloalkyl radical containing one to about ten carbon atoms or a halosilyl radical or haloalkylsilyl radical containing one to about eight carbon atoms, and X and $X^1$ are halogen, hydrogen, or alkyl or haloalkyl radicals containing one to about ten carbon atoms. Typically, R is a chloroalkyl radical containing one to about eight carbon atoms and one to about twelve chlorine atoms, and X is chlorine or a chloroalkyl radical containing one to four carbon atoms, and $X^1$ is a hydrogen or chlorine. Preferable haloalkylchlorosilanes useful in this invention are dichlorosilanes and trichlorosilanes. Also preferable are haloalkylchlorosilanes containing a chloroalkyl group containing one to about four carbon atoms and one to ten chlorine atoms. Preferable haloalkylchlorosilanes include dichloromethyl trichlorosilane, trichloromethyl trichlorosilane, dichloromethyl dichlorosilane, trichloromethyl dichlorosilane, chloromethyl trichlorosilane and hexachlorodisilane. Trichloromethyl trichlorosilane and dichloromethyl trichlorosilane are most preferred.

In preparation of the stereospecific supported catalyst components of this invention, typically, the magnesium-containing product, titanium(IV) component, and hindered ester component are contacted in amounts such that the atomic ratio of titanium to metal in the magnesium-containing component is at least about 0.5:1. Preferably, this ratio ranges from about 0.5:1 to about 20:1 and more preferably, from about 2:1 to about 15:1. The electron donor component used in Step C is used in an amount ranging from about 0.001 to about 1.0 mole per gram atom of titanium, and preferably from about 0.005 to about 0.6 mole per gram atom. Best results are achieved when this ratio ranges from about 0.01 to about 0.3 mole per gram atom of titanium.

Typically, at least equimolar amounts of the precipitation agent to magnesium alkyl-ester complex is used, although the precipitation agent conveniently may be used in moderate excess.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with Lewis acid.

Although the chemical structure of the catalyst components described herein is not presently known, the components preferably contain from about 1 to about 6 wt. % titanium, from about 10 to about 25 wt. % magnesium, and from about 45 to about 65 wt. % halogen. Preferred catalyst components made according to this invention contain from about 1.0 to about 3 wt. % titanium, from about 15 to about 21 wt. % magnesium and from about 55 to about 65 wt. % chlorine.

The titanium-containing catalyst component of this invention may be prepolymerized with an alpha-olefin before use as a polymerization catalyst component. In prepolymerization catalyst and an organoaluminum compound co-catalyst such as triethylaluminum are contacted with an alpha-olefin such as propylene under polymerization conditions, preferably in the presence of a modifier such as a silane and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity, stereospecificity and attrition resistance.

The titanium-containing catalyst component of this invention is used in a polymerization catalyst containing a co-catalyst component including a Group II or III metal alkyls and, typically, one or more modifier compounds.

Useful Group II and IIIA metal alkyls are compounds of the formula $MR_m$ wherein M is a Group II or IIIA metal, each R is independently an alkyl radical of 1 to about 20 carbon carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $ZN(C_6H_{13})_2$, $Zn(C_{12}H_{25})_2$, $Al(CH_3)_3$, $Al(C_2H_5)_3$, $Al(C_3H_7)_3$, $AL(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

To maximize catalyst activity and stereospecificity, it is preferred to incorporate one or more modifiers, typically electron donors, and including compounds such as silanes, mineral acids, organometallic chalcogenide derivatives of hydrogen sulfide, organic acids, organic acid esters and mixtures thereof.

Organic electron donors useful as cocatalyst modifiers useful in this invention are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can be employed if desired.

Preferred organic acids and esters are benzoic acid, halobenzoic acids, phthalic acid, isophthalic acid, terephthalic acid and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, methyl anisate, ethyl anisate, methyl p-toluate, hexyl benzoate, and cyclohexyl benzoate, and diisobutyl phthalate as these give good results in terms of activity and stereospecificity and are convenient to use.

The polymerization co-catalyst useful in this invention advantageously contains an aromatic silane modifier. Preferable silanes useful in co-catalysts in this invention include alkyl-, aryl-, and/or alkoxy-substituted silanes containing hydrocarbon moieties with one to about 20 carbon atoms. Especially preferred silanes are aryl-substituted having a structure:

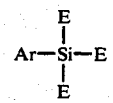

wherein Ar is an aryl group of about 6 to about 20 carbon atoms, such as phenyl, dodecylphenyl, cresyl, and the like, each E is independently R' or OR' with R' having 1 to about 20 carbon atoms. The preferred aromatic silanes include diphenyldimethoxysilane, phenyltrimethoxysilane, phenylethyldimethoxysilane and methylphenyldimethoxysilane.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.05 milligrams of catalyst to gram of polymer produced.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not be below the vapor pressure at the polymerization temperature of the alpha-olefin to be polymerized.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is useful include both stirred bed reactors and fluidized bed reactor systems are described in U.S. Pat. Nos. 3,957,448, 3,965,083, 3,971,768, 3,970,611, 4,129,701, 4,101,289; 3,652,527 and 4,003,712 all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid which can be liquid monomer, can be added to polymerizing olefin through the recycle gas system in order to control temperature.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

The invention described herein is illustrated, but not limited, by the following Examples and Comparative Runs.

EXAMPLE I

Step A—Formation of Magnesium Alkyl-Hindered Ester Complex

In an inert atmosphere dry box, 3.75 milliliters of ethyl 2,4,6-trimethylbenzoate was added to 75 milliliters of MAGALA (7.5)-E (10.3 wt. % solution of di-n-butyl magnesium and triethylaluminum in hexane containing 1.63 wt. % Mg and 0.25 wt. % Al). The resulting solution had a characteristic yellow color of a metal alkyl/ester complex which was confirmed by a shift of a carbonyl frequency in the infrared spectrum (shift of $\nu_{co}$ from 1734 cm$^{-1}$ to 1670 cm$^{-1}$). The solution was sealed in a four-ounce bottle with a rubber septum.

Step B—Precipitation with Silicon Tetrachloride

To 75 milliliters of reagent grade silicon tetrachloride in a three-necked 300 milliliter round bottom flask equipped with a condenser and mechanical stirrer was added the solution from Step A under a blanket of prepurified nitrogen over a period of 45 minutes with stirring (450 rpm). When addition was complete, the resulting mixture was heated to 40° C. for 16 hours during which time precipitation of a white solid was complete. The solid was washed with five 100-milliliter aliquots of purified hexane, put into the dry box, filtered and weighed. A total of 4.0 grams of white solid was recovered which contained 43.9 wt. % chlorine, 14.9 wt. % magnesium and 32.1 wt. % ethyl 2,4,6-trimethylbenzoate ester content determined by gas chromatographic analysis.

Step C—Titanium(IV) Compound Addition

A 3.6 gram sample of the solid recovered in Step B was combined with 18.2 milliliters of titanium tetrachloride, 1.6 milliliters of diisobutylphthalate, and 100 milliliters of toluene (distilled over sodium) in a 300 milliliter, three-necked round bottom flack equipped with a condenser and mechanical stirrer. The resulting mixture was refluxed (~93° C.) for two hours. Supernatant liquid was decanted and the residue washed three times with 50-milliliter portions of toluene. Approximately two grams of yellow solid was recovered. Analysis of this solid product showed 49.2 wt. % chlorine, 12.8 wt. % magnesium, 3.75 wt. % titanium, 24.5 wt. % diisobutylphthalate and 2.9 wt. % ethyl 2,4,6-trimethylbenzoate. This solid was combined with 75 milliliters of toluene and heated to 108° C. for 30 minutes after which time supernatant liquid was decanted and the residue washed with three 50-milliliter portions of toluene.

A portion of titanium tetrachloride (100 milliliters) was added to the solid and the resulting mixture heated to 110° C. for 60 minutes. The supernatant was decanted and the residue washed with five 100-milliliter portions of hexane and filtered under nitrogen.

A total of 1.5 grams of solid was recovered which contained 54.1 wt. % chlorine, 13.8 wt. % magnesium, 4.31 wt. % titanium, 21.4 wt. % diisobutylphthalate and 0.4 wt. % 2,4,6-trimethylbenzoate.

EXAMPLE II

Another catalyst component was prepared in a manner similar to that described in Example I except that in Steps A and B 50 milliliters of silicon tetrachloride, 50 milliliters of MAGALA (7.5)-E and 2.5 milliliters of ethyl 2,4,6-trimethylbenzoate were used. A total of 2.2 grams of catalyst component was recovered which contained 53.0 wt. % chlorine, 12.4 wt. % magnesium, 5.2 wt. % titanium, 25.6 wt. % diisobutylphthalate and 0.2 wt. % ethyl 2,4,6-trimethylbenzoate.

EXAMPLE III

Another catalyst component was prepared in a manner similar to that described in Example I except as noted: In Step A, 3.5 milliliters of ethyl 2,6-dimethylbenzoate was used as the magnesium-complexing ester. The infrared carbonyl absorbance shifted from 1736 cm$^{-1}$ (showing a free ester) to 1679 cm$^{-1}$ (showing a complexed ester). In Step B, 4.6 grams of a white solid was recovered which contained 39.6 wt. % chlorine, 13.4 wt. % magnesium and 30.0 wt. % ethyl 2,6-dimethylbenzoate. In Step C, a 4.0-gram sample of the solid recovered from Step B was combined with 27 milliliters of titanium tetrachloride and 1.6 milliliters of diisobutylphthalate in 100 milliliters of an equal volume mixture of chlorobenzene and 1,2-dichloroethane and refluxed at 97° C. After final treatment with toluene and titanium tetrachloride followed by hexane washing, a total of 1.1 grams of solid was recovered which contained 61.9 wt. % chlorine, 20.0 wt. % magnesium, 1.8 wt. % titanium, 6.3 wt. % diisobutylphthalate and <0.5 wt. % ethyl 2,6-dimethylbenzoate. Polymerization tests using this catalyst component are shown in Table I.

COMPARATIVE RUN A

A comparative catalyst component was prepared in a manner similar to that described in Example I except that in Step A no hindered aromatic ester or other Lewis base was used.

In Step B, to a mixture of 25 milliliters of silicon tetrachloride and 25 milliliters of toluene, 50 milliliters of MAGALA (7.5)-E were added dropwise over 10 minutes. The resulting mixture was heated to 60° C. for three hours. After cooling to room temperature, supernatant liquid was decanted and the residue was washed twice with 100-milliliter portions of toluene. A mixture of 25 milliliters each of silicon tetrachloride and toluene was added to the washed residue followed by dropwise addition over 15 minutes of one milliliter of titanium tetrachloride diluted in 10 milliliters of toluene. This mixture was heated to 60° C. with stirring for one hour.

The supernatant was decanted and the remaining solid washed twice with 50-milliliter portions of toluene.

The solid from Step B was combined with 30 milliliters of toluene, 9.1 milliliters of titanium tetrachloride and 0.8 milliliters of diisobutylphthalate, heated to reflux (110° C.) in 45 minutes and refluxed for 90 minutes. The supernatant was decanted and the residue washed twice with 50-milliliter portions of toluene. The solid was treated with toluene and titanium tetrachloride as described in Example I except that 50 milliliters of toluene were used and the number of toluene washes was five.

COMPARATIVE RUN B

A comparative catalyst component was prepared in a manner similar to that described in Example II except that an equimolar amount (2.2 milliliters) of 2,2,'6,6'-tetramethylpiperidine (TMPip) was substituted for ethyl 2,4,6-trimethyl benzoate in Step A. The solid isolated after Step B contained 43.9 wt. % chlorine, 17.0 wt. % magnesium and 0.5 wt. % TMPip. The final catalyst component (1.0 gram) contained 49.0 wt. % chlorine and 9.6 wt. % magnesium, 7.3 wt. % titanium and 27.4 wt. % diisobutylphthalate and less than the minimum detectable amount (<0.4 wt. %) of TMPip.

COMPARATIVE RUN C

A comparative catalyst component was prepared in a manner similar to Example II and Comparative Run B except that an equimolar quantity (2.6 milliliters) of diisoamylether (DIAE) was substituted for ethyl 2,4,6-trimethyl benzoate in Step A. The solid isolated after Step B contained 60.8 wt. % chlorine, 20.4 wt. % magnesium and 4.0 wt. % DIAE. The final catalyst component contained 47.8 wt. % chlorine, 10.0 wt. % magnesium, 6.2 wt. % titanium and 31.1 wt. % diisobutylphthalate and no evidence of DIAE.

EXAMPLES IV-IX

Additional examples of the catalyst component of this invention were prepared in a manner generally similar to that described in Examples I and II using ethyl 2,6-dimethylbenzoate or ethyl 2,4,6-trimethylbenzoate as a complexing agent. In these examples it was found that using a 50/50 by volume mixture of chlorobenzene and 1,2-dichloroethane as the solvent in Step C, eliminated the need for subsequent hot toluene and titanium tetrachloride treatments. Except for Example VII, the molar ratio of di-n-butylmagnesium (in MAGALA) to complexing ester was 2.1/1. Comparative Runs D and E are also included. Slurry polymerization results for Examples IV-VIII and Runs D and E are shown in Table III. Such slurry polymerizations were performed in a manner described in Example I except that propylene pressure was 150 psig.

Table V summarizes compositional analyses of final catalyst components and Step B precursors.

Preparational details of Examples IV-VIII and Comparative Runs D and E are as follows

EXAMPLE IV

A catalyst component was prepared in a manner described in Example III except that in Step A 7.0 milliliters of 2,6-dimethylbenzoate and 150 milliliters of MAGALA (7.5)-E was used. In Step B, to 150 milliliters of reagent grade silicon tetrachloride in a three-necked 1000-milliliter round bottom flask equipped with a condenser and a mechanical stirrer were added the solution from Step A under a blanket of prepurified nitrogen over a period of ninety minutes with stirring at 250 rpm. The resulting mixture was heated to 40° C. for 16 hours, after which time a precipitate was washed with five 150-milliliter aliquots of purified hexane, placed into a dry box, filtered and weighed. A total of 9.8 grams of solid was recovered. In Step C, the solid from Step B was combined with 100 milliliters of 1,2-dichloroethane, 100 milliliters of chlorobenzene, 60 milliliters of titanium tetrachloride and 3.2 milliliters of diisobutylphthalate in a 1000-milliliter round bottom flask equipped with a condenser and mechanical stirrer. The mixture was refluxed for two hours at 102° C. Supernatant liquid was decanted and washed three times with 100-milliliter portions of toluene followed by two 150-milliliter portions of hexane. After filtering, a total of 3.7 grams of solid was recovered with a composition of 57.8 wt. % Cl, 18.0 wt. % Mg, 1.6 wt. % Ti and 12.2 wt. % diisobutylphthalate.

EXAMPLE V

A catalyst component was prepared in the same manner as described in Example IV except that in Step B the mixture was heated at 50° C. and 9.2 grams of solid were recovered. In Step C, 5.2 grams of solid were recovered with a composition 59.3 wt. % Cl, 18.4 wt. % Mg, 1.8 wt. % Ti and 11.9 wt. % diisobutylphthalate.

EXAMPLE VI

This Example was identical to that described in Example IV except that in Step A the amount of ethyl 2,6-dimethylbenzoate was 2.3 milliliters and the amount of MAGALA (7.5)-E was 50 milliliters. In Step B, 50 milliliters of silicon tetrachloride were used in a 300-milliliter flask and 2.6 grams of solid were recovered. In Step C, reactant quantities were reduced from that used in Example IV to 50 milliliters of 1,2-dichloroethane, 50 milliliters of chlorobenzene, 30 milliliters of titanium tetrachloride and 1.6 milliliters of diisobutylphthalate, all combined in a 300-milliliter flask. Toluene washes were 75 milliliters each. A total of 1.3 grams of solid catalyst component were recovered with a composition of 57.3 wt. % Cl, 17.9 wt. % Mg, 1.8 wt. % Ti and 15.6 wt. % diisobutylphthalate.

EXAMPLE VII

In this Example Step A was identical to that described in Example I except that 1.61 milliliters of ethyl 2,4,6-trimethylbenzoate and 50 milliliters of MAGALA (7.5)-E were used. Steps B and C were identical to that described in Example VI except that in Step B the reaction time was reduced from 16 hours to 2 hours and the temperature was increased to 72° C. A total of 2.28 grams of solid was recovered with a composition of 50.5 wt. % Cl, 17.2 wt. % Mg and 27.6 wt. % ethyl 2,4,6-trimethylbenzoate. In Step C, the amount of titanium tetrachloride used was 27 milliliters. A total of 1.28 grams of solid catalyst component was recovered with a composition of 54.8 wt. % Cl, 16.4 wt. % Mg, 2.4 wt. % Ti and 18.1 wt. % diisobutylphthalate.

EXAMPLE VIII

A catalyst component was prepared in three steps. Step A: In an inert atmosphere dry box, 4.6 milliliters of ethyl 2,6-dimethylbenzoate was added to 100 milliliters of MAGALA (7.5)-E and the resulting solution was placed in a four-ounce bottle sealed with a rubber septum. Step B: To 100 milliliters of reagent grade silicon tetrachloride in a 500-milliliter resin kettle equipped with a condenser and mechanical stirring was added the solution from Step A under a blanket of prepurified nitrogen over a period of 60 minutes with a stirring rate of 350 rpm. When addition was complete, stirring was slowed to 150 rpm and the mixture was heated to 40°-50° C. for 16 hours. The solid product was washed with five 200-milliliter aliquots of purified hexane, placed into the dry box, filtered and weighed. A total of 6.3 grams of white solid was recovered. Step C: The solid product recovered from Step B was combined with 75 milliliters of 1,2-dichloroethane, 75 milliliters of chlorobenzene, 40 milliliters of titanium tetrachloride and 2.1 milliliters of diisobutylphthalate in an 500-milliliter resin kettle equipped with a condenser and mechanical stirrer. The resulting mixture was refluxed for two hours at 102° C. Supernatant liquid was decanted and the residue washed three times with 75-milliliter portions of toluene followed by two 200-milliliter portions of hexane. After filtering, a total of 2.9 grams of solid was recovered with a composition of 54.7 wt. % Cl, 18.0 wt. % Mg, 2.4 wt. % Ti and 16.5 wt. % diisobutylphthalate.

EXAMPLE IX

This Example was identical to that described in Example VIII except that in Step A a mixture of 69 milliliters of butyloctyl magnesium (BOMAG-D) and 31 milliliters of toluene was substituted for MAGALA (7.5)-E. In Step B, the initial stirring rate was 450 rpm, hexane washes were 75 milliliters each and the amount of solid recovered was 7.4 grams. In Step C, a total of 150 milliliters of chlorobenzene was substituted for the 1/1 mixture of chlorobenzene and dichloroethane. The amount of catalyst component recovered was 2.8 grams with a composition shown in Table V.

COMPARATIVE RUN D

A comparative catalyst component was prepared in a manner identical to that described in Example VII except that the hindered ester was omitted from Step A. In Step A, 100 milliliters of MAGALA (7.5)-E were added directly to 100 milliliters of silicon tetrachloride as in Step B of Example VIII. A total of 3.8 grams of solid was recovered from Step B and a total of 2.8 grams of solid catalyst component was recovered after Step C with a composition of 58.7 wt. % Cl. 19.3 wt. % Mg, 2.2 wt. % Ti and 13.2 wt. % diisobutylphthalate.

COMPARATIVE RUN E

Another comparative catalyst component was prepared identical to that described in Example VIII except that ethyl benzoate was used as the ester in Step A. The composition of the material after Step B and of the final catalyst is included in Table V.

Polymerization Tests

The titanium-containing catalyst components prepared above were tested in batch hexane-slurry propylene polymerizations. A two-liter Parr reactor was charged with 650 milliliters of hexane, 250 psig of propylene and 4 psig of hydrogen. About 20 milligrams of titanium-containing catalyst component together with a triethylaluminum (TEA)-based cocatalyst system (Al/Ti >200:1) was used in the polymerization test run for two hours at 160° F. Results are shown in Tables I and II. Polymer particle size distributions for catalyst components from Examples I-III and V-VIII and Comparative Runs D and E shown in Table III.

A series of batch gas phase propylene polymerizations were performed in a 2.5-liter reactor at 160° C. at 300 psig with stirring at 50 rpm with a residence time of 2.0 hours using catalysts prepared in Examples IV and V. Results are shown in Table IV. Catalyst compositions are summarized in Table V.

TABLE I

| | Slurry Polymerization Performance | | | | | |
|---|---|---|---|---|---|---|
| Example (Run) | Lewis Base in Step B[1] | Cocatalyst System[2] | Yield (g/g) | Solubles (wt. %) | Extractables (wt. %) | Bulk Density (lbs/ft³) |
| I | ETMB | a | 5963 | 0.8 | 1.6 | 23.0 |
| I | ETMB | b | 7757 | 0.6 | 2.2 | 22.4 |
| I | ETMB | c | 8556 | 1.3 | 3.6 | 22.7 |
| I[3] | ETMB | a | 4857 | 0.8 | 1.2 | 24.0 |
| II | ETMB | a | 7959 | 0.8 | 1.4 | 19.9 |
| II | ETMB | b | 7900 | 0.8 | 1.8 | 19.3 |
| II | ETMB | c | 9507 | 1.4 | 4.7 | 19.9 |
| III | EDMB | a | 7770 | 0.8 | 1.2 | 23.5 |
| III | EDMB | b | 10,840 | 0.7 | 2.1 | 23.8 |
| A | none | a | 1052 | 20.5 | ND[4] | 22.9 |
| A | none | c | 1022 | 32.8 | ND | ND |
| B | TMPiP | a | 1952 | 9.0 | 1.7 | 14.7 |
| B | TMPiP | c | 5249 | 17.1 | ND | ND |
| C | DIAE | a | 1352 | 10.9 | ND | 19.9 |
| C | DIAE | c | 1755 | 15.5 | ND | 19.2 |

[1]ETMB = Ethyl 2,4,6-Trimethylbenzoate
DIAE = Diisoamylether
TMDip = 2,2,6,6-Tetramethylpiperidine
EDMB = Ethyl 2,6-Dimethylbenzoate
[2]Cocatalyst Systems:
a = TEA/Diphenyldimethoxysilane (molar ratio 10/1)
b = TEA/Diphenyldimethoxysilane (molar ratio 20/1)
c = TEA/Tetramethylpiperidine (molar ratio 20/1)
[3]Before final treatment with toluene and TiCl₄
[4]ND = Not determined

TABLE II

| | Slurry Polymerization Performance[1] | | | | |
|---|---|---|---|---|---|
| Example (Run) | Cocatalyst System[2] | Yield (g/g) | Solubles (wt. %) | Extractables (wt. %) | Bulk Density (lbs/ft³) |
| IV | a | 7880 | 0.5 | 0.8 | 22.7 |
| IV | b | 7790 | 0.9 | 1.5 | 22.2 |
| V | a | 10,580 | 0.4 | 1.7 | 21.7 |
| V | b | 11,500 | 0.9 | 2.0 | 21.8 |
| VI | a | 6870 | 0.7 | 0.8 | 21.9 |
| VI | b | 8000 | 1.0 | 1.2 | 21.6 |
| VII | a | 4500 | 1.6 | 1.9 | 24.0 |
| VII | b | 3150 | 1.4 | 1.5 | 24.4 |
| VIII | a | 9460 | 0.4 | 1.3 | 20.3 |
| VIII | b | 10,590 | 0.4 | 1.0 | 20.3 |
| D | a | 2090 | 5.0 | 0.6 | 19.5 |
| D | b | 1780 | 7.0 | 1.0 | 14.1 |
| E | a | 4620 | 0.9 | 1.4 | 24.5 |
| E | b | 6110 | 1.1 | 3.1 | 25.1 |
| IX | a | 12,080 | 0.4 | 0.8 | 26.4 |
| IX | b | 13,850 | 0.7 | 1.0 | 25.6 |

[1]Conditions same as in Table I except Pressure = 150 psig.
[2]Same as in Table I

TABLE III

| | | Polymer Particle Size Distribution | | | | | | | | | |
|---|---|---|---|---|---|---|---|---|---|---|---|
| Sieve | | Percent of Total Weight | | | | | | | | | |
| No. | microns | I | II | III | V | VI | VII | VIII | D | E | IX |
| 20 | >850 | 1.4 | 0.3 | 0.9 | 0.1 | 0.1 | 0 | 0.2 | 63.0 | 94.3 | 0.2 |

TABLE III-continued

| Sieve | | Polymer Particle Size Distribution Percent of Total Weight | | | | | | | | | |
|---|---|---|---|---|---|---|---|---|---|---|---|
| No. | microns | I | II | III | V | VI | VII | VIII | D | E | IX |
| 40 | 425–850 | 13.1 | 14.9 | 22.0 | 46.3 | 10.8 | 0 | 65.8 | 16.0 | 3.7 | 25.1 |
| 60 | 250–425 | 67.0 | 81.6 | 74.2 | 52.2 | 77.0 | 16.5 | 33.6 | 8.0 | 1.1 | 73.3 |
| 80 | 180–250 | 17.4 | 2.8 | 2.4 | 1.2 | 7.8 | 79.8 | 0.2 | 5.0 | 0.3 | 1.1 |
| 100 | 150–180 | 1.1 | 0.2 | 0.2 | 0.1 | 1.8 | 1.9 | 0.1 | 2.0 | 0.2 | 0.1 |
| 200 | 75–150 | 0.2 | 0.2 | 0.2 | 0.1 | 2.0 | 1.6 | 0.2 | 6.0 | 0.3 | 0.2 |
| Pan | <75 | 0 | 0.1 | 0.1 | 0.1 | 0.5 | 0.3 | 0 | 0 | 0 | 0.2 |

TABLE IV

| | Gas Polymerization Performance | | | |
|---|---|---|---|---|
| Example | Al/Si/Ti[1] (molar ratio) | Yield (g/g) | Extractables (wt. %) | Bulk Density (lbs/ft³) |
| IV | 200/20/1 | 9500[2] | 0.75 | 20.0 |
| IV | 200/10/1 | 6000[2] | 1.7 | 20.0 |
| V | 200/20/1 | 8800[3] | 1.0 | 22.7 |
| V | 200/20/1 | 6100[3] | 0.87 | 22.2 |

[1] Molar ratio of TEA/Diphenyldimethoxysilane/Ti (catalyst assumed to contain 2.0 wt. % Ti)
[2] Based on 18.0 wt. % Mg
[3] Based on 18.4 wt. % Mg
[4] Catalyst component prepolymerized to 15 wt. % polypropylene content.

TABLE V

| Example (Run) | Composition After Step A (wt. %) | | | Final Catalyst Composition (wt. %) | | | | Step A Base |
|---|---|---|---|---|---|---|---|---|
| | Mg | Cl | Base | Ti | Mg | Cl | DIBP | |
| I | 14.9 | 43.9 | 32.1 | 4.3 | 13.8 | 54.1 | 21.4 | 0.4 |
| II | ND | ND | ND | 5.2 | 12.4 | 53.0 | 25.6 | 0.2 |
| B | 17.1 | 43.9 | <0.5 | 7.3 | 9.6 | 49.0 | 27.4 | <0.5 |
| C | 20.4 | 60.8 | 4.0 | 6.2 | 10.0 | 47.8 | 31.1 | <0.5 |
| III | 13.4 | 39.6 | 30.0 | 1.8 | 20.0 | 61.9 | 6.32 | <0.5 |
| IV | ND | ND | ND | 1.6 | 18.0 | 57.8 | 12.2 | ND |
| V | ND | ND | ND | 1.8 | 18.4 | 59.3 | 11.9 | <0.5 |
| VI | ND | ND | ND | 1.8 | 17.9 | 57.3 | 15.6 | ND |
| VII | 17.2 | 50.5 | 27.6 | 2.4 | 16.4 | 54.8 | 18.1 | ND |
| VIII | ND | ND | ND | 2.4 | 18.0 | 54.7 | 16.5 | <0.5 |
| D | 21.9 | 65.4 | 0 | 2.2 | 19.3 | 58.7 | 13.2 | 0 |
| E | 14.5 | 31.0 | <0.5 | 2.1 | 17.5 | 56.3 | 17.7 | <0.5 |
| IX | | | ND | | | | 5.8 | 0.5 |

ND = Not Determined

These results demonstrate that the relative success of the catalysts described above depends on introducing in Step A a suitable Lewis base that meets the following requirements: First, the base must be unreactive (except for complexation) in the presence of the alkyl magnesium. In the case of aromatic esters, apparently sterically hindering groups ortho to the carboxylic group prevent rapid irreversible reactions that would otherwise occur.

Secondly, the base must be such that its association with magnesium persists through a chlorination reaction. Weak bases such as diisoamylether and 2,2,6,6-tetramethylpiperidine are unable to meet this requirement.

Thirdly, the base must still be weak enough so that in the presence of titanium tetrachloride it is replaced by another base such as diisobutylphthalate which is preferred as a final catalyst component. Esters of monocarboxylic acids appear to be especially well-suited to meet this requirement.

The data shown in Table III demonstrate that, based on the above description, a superior morphology catalyst can be prepared with excellent activity and stereospecificity.

What is claimed is:

1. A solid, hydrocarbon-insoluble, alpha-olefin polymerization catalyst component comprising the product formed by:
    A. complexing a magnesium alkyl composition with an ortho disubstituted hindered carboxylic aromatic acid ester having a structure:

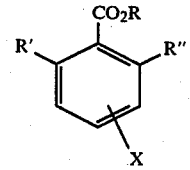

wherein R is an alkyl group containing one to about ten carbon atoms, and R' and R" are alkyl groups containing one to about six carbon atoms or —Cl or —Br and X is hydrogen, an alkyl group, an aryl group, an —OR group or a halogen;
    B. reacting the resulting stable complex with a compatible precipitation agent to form a solid component; and
    C. reacting the resulting solid with a titanium(IV) compound in a suitable diluent containing a suitable electron donor compound.
2. The catalyst component of claim 1 wherein the hindered aromatic ester is ethyl 2,4,6-trimethylbenzoate, ethyl 2,6-dimethylbenzoate, ethyl 2,4,6-triethylbenzoate, methyl 2,4,6-trimethylbenzoate, methyl 2,6-dimentylbenzoate, ethyl 2,6-diethylbenzoate, ethyl 2,3,5,6-tetramethylbenzoate, ethyl 2,6-bis(triflouromethyl)benzoate, ethyl 2,6-dimethyl-6-ethylbenzoate or ethyl 2,6-dimethyl-4-ethylbenzoate.
3. The catalyst component of claim 1 wherein the hindered aromatic ester is ethyl 2,4,6-trimethylbenzoate or ethyl 2,6-dimethylbenzoate.
4. The catalyst component of claim 1 wherein the titanium (IV) compound is titanium tetrachloride.
5. The catalyst component of claim 1 wherein the diluent in Step C is an aromatic hydrocarbon, a halogenated aromatic hydrocarbon or a mixture of a halogenated aromatic hydrocarbon and a halogenated aliphatic hydrocarbon.
6. The catalyst component of claim 1 wherein the diluent in Step C is chlorobenzene or a mixture of chlorobenzene and 1,2-dichloroethane.
7. The catalyst component of claim, 1 wherein the electron donor compound in Step C is an carboxylic aromatic acid ester.
8. The catalyst component of claim 1 wherein the electron donor in Step C is a dialkylphthalate ester.
9. The catalyst of claim 7 wherein the ester is diisobutylphthalate.
10. The catalyst component of claim 1 wherein the precipitation is silicon tetrachloride, t-butyl chloride or dry hydrogen chloride.

11. The catalyst component of claim 1 wherein the precipitation agent is silicon tetrachloride.

12. A catalyst component of claim 1 which is further treated with toluene and titanium tetrachloride.

13. The catalyst component of claim 1 wherein the magnesium alkyl composition contains alkyl group with two to about ten carbon atoms.

14. The catalyst composition of claim 1 wherein the magnesium alkyl composition is di-n-butyl magnesium, di-n-methyl magnesium, di-n-propyl magnesium or butyloctyl magnesium.

15. The catalyst component of claim 1 wherein the magnesium alkyl composition contains an aluminum alkyl.

16. The catalyst composition of claim 1 wherein the magnesium alkyl composition is a mixture of di-n-butyl magnesium and triethylaluminum.

17. The catalyst composition of claim 1 wherein the magnesium alkyl composition is a mixture of butyloctyl magnesium and diethylether.

18. A solid, hydrocarbon-insoluble alpha-olefin polymerization catalyst component of claim 1 comprising the product formed by:

A. complexing a magnesium alkyl composition with ethyl 2,6-dimethyl benzoate or ethyl 2,4,6-trimethyl benzoate;

B. reacting the resulting complex with silicon tetrachloride to form a solid component; and C. reacting the resulting solid with titanium tetrachloride in a liquid aromatic diluent containing a dialkylphthalate ester.

19. The catalyst component of claim 18 wherein the magnesium alkyl composition contains di-n-butyl magnesium or butyloctyl magnesium.

20. The catalyst component of claim 18 wherein the aromatic diluent in Step C is an aromatic hydrocarbon, a halogenated aromatic hydrocarbon or a mixture of a halogenated aromatic hydrocarbon and a halogenated aliphatic hydrocarbon.

21. A complex formed by contacting a magnesium alkyl composition with an alkyl hindered carboxylic aromatic acid ester.

22. The complex of claim 21 wherein the hindered ester is ethyl 2,4,6-trimethylbenzoate, ethyl 2,6-dimethylbenzoate, ethyl 2,4,6-triethylbenzoate, methyl 2,4,6-trimethylbenzoate, methyl 2,6-dimethylbenzoate, ethyl 2,6-diethylbenzoate, ethyl 2,3,5,6-tetramethylbenzoate, ethyl 2,6-bis(triflouromethyl)benzoate, ethyl 2,6-dimethyl-6-ethylbenzoate or ethyl 2,6-dimethyl-4-ethylbenzoate.

23. The complex of claim 21 wherein the hindered ester is ethyl 2,4,6trimethylbenzoate or ethyl 2,6-dimethylbenzoate.

24. The complex of claim 21 wherein the magnesium alkyl composition contains alkyl groups with two to about ten carbon atoms.

25. The complex of claim 21 wherein the magnesium alkyl composition is di-n-butyl magnesium, di-n-methyl magnesium, di-n-propyl magnesium or butyloctyl magnesium.

26. The complex of claim 25 wherein hindered ester is ethyl 2,6-dimethylbenzoate or ethyl 2,4,6-trimethylbenzoate.

* * * * *